(12) United States Patent
Seidl

(10) Patent No.: US 8,256,589 B2
(45) Date of Patent: Sep. 4, 2012

(54) SPRING STRUT WITH CONTROL SLEEVE

(75) Inventor: Josef Seidl, Dingolfing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 12/755,021

(22) Filed: Apr. 6, 2010

(65) Prior Publication Data
US 2010/0187060 A1    Jul. 29, 2010

Related U.S. Application Data

(63) Continuation of application No. PCT/EP2008/009485, filed on Nov. 11, 2008.

(30) Foreign Application Priority Data

Dec. 12, 2007 (DE) .................... 10 2007 059 765

(51) Int. Cl.
F16F 9/58 (2006.01)
B60G 17/02 (2006.01)

(52) U.S. Cl. ............... 188/322.16; 267/220; 267/225

(58) Field of Classification Search ............ 188/266, 188/322.16, 322.19, 269; 267/170, 177, 267/219–220, 195, 225
See application file for complete search history.

(56) References Cited

FOREIGN PATENT DOCUMENTS

| DE | 231 546 A1 | 1/1986 |
|---|---|---|
| DE | 37 39 663 A1 | 6/1989 |
| DE | 295 14 552 U1 | 12/1995 |
| DE | 103 36 155 B3 | 3/2005 |
| DE | 199 51 728 B4 | 2/2006 |
| EP | 1 403 103 A2 | 3/2004 |
| EP | 1 681 188 A1 | 7/2006 |
| EP | 1 734 277 A1 | 12/2006 |
| GB | 752284 | 7/1956 |
| NL | 1029266 C | 12/2006 |
| SU | 1017851 A2 | 5/1983 |

OTHER PUBLICATIONS

German Search Report dated Nov. 25, 2008 including partial English translation (Nine (9) pages).
International Search Report dated Feb. 10, 2009 including English translation (Six (6) pages).

*Primary Examiner* — Robert A Siconolfi
*Assistant Examiner* — Anna Momper
(74) *Attorney, Agent, or Firm* — Crowell & Moring LLP

(57) ABSTRACT

A suspension strut with an elastomer block for a wheel of a vehicle, in particular, for a wheel of a motorcycle is provided. The spring constant of the elastomer block, which interacts with an additional spring element, can be changed by introducing a control sleeve between the elastomer block and the body of the suspension strut. The elastomer block further is effectively disengaged from the additional spring element when the control sleeve is in a lower end position, so that the spring rate is determined only by the additional spring element.

7 Claims, 1 Drawing Sheet

SPRING STRUT WITH CONTROL SLEEVE

CROSS REFERENCE TO RELATED APPLICATIONS

This application is a U.S. Continuation Application of International Application No. PCT/EP2008/009485, filed Nov. 11, 2008, and claims priority under 35 U.S.C. §119 to German Patent Application No. 10 2007 059 765.9, filed Dec. 12, 2007, the entire disclosures of which are expressly incorporated by reference herein.

BACKGROUND AND SUMMARY OF THE INVENTION

The invention relates to a suspension strut for a wheel of a vehicle, in particular a wheel of a motorcycle, having an adjustable spring apparatus.

Netherlands patent document No. NL 1 029 266 discloses such a suspension strut. In particular, FIGS. 10 to 12 show a suspension strut with a helical spring and an elastomer block, which is connected in series thereto. The elastomer block is designed in such a manner that at least one section of the length of this elastomer block has a cavity in the direction of the outer wall of the cylinder. During compression, the material of the elastomer can escape into this cavity. A conical control sleeve can be pushed into the cavity. As a result, depending on the working depth of the control sleeve, the elastomer has increasingly fewer escape possibilities, as a consequence of which its spring hardness increases.

The object of the invention is to provide an improved suspension strut conforming to its genre.

According to the invention, the control sleeve not only increasingly limits the escape space of the elastomer block, it also totally eliminates the elastomer block as the spring element, when the control sleeve is adjusted so far downwards that it strikes against the displaceable spring plate. The control sleeve also allows a position somewhat above the spring plate, in which the elastomer block still acts initially as a spring—even if at a higher spring constant. However, as soon the spring plate strikes against the lower edge of the control sleeve during the compression of the suspension strut, then the elastomer block is no longer effective as the second spring element. In this way the spring characteristic of the entire suspension strut system can be adjusted selectively over a wide range.

For its axial displacement, the control sleeve is guided in an advantageous manner externally on the cylinder jacket of the damping cylinder. This displacement can occur in a simple way by means of a threaded connection. The adjusting force can be applied by hand or with, for example, an electric actuating drive.

An even larger setting range of the spring characteristic can be achieved by an additional advantageous strategy of the invention. In this case the stop against which the elastomer block is upwardly braced is also axially displaceable. As a result, a more or less large preload on the whole system can be adjusted.

In this case it is especially practical to mount this stop on the control sleeve by a threaded connection.

In order to hold the elastomer block securely in its position and to prevent it from arching outwardly during compression, an additional practical embodiment of the invention provides that a sleeve jacket envelops the elastomer block.

Other objects, advantages and novel features of the present invention will become apparent from the following detailed description when considered in conjunction with the accompanying drawings.

DETAILED DESCRIPTION

Figure 1:
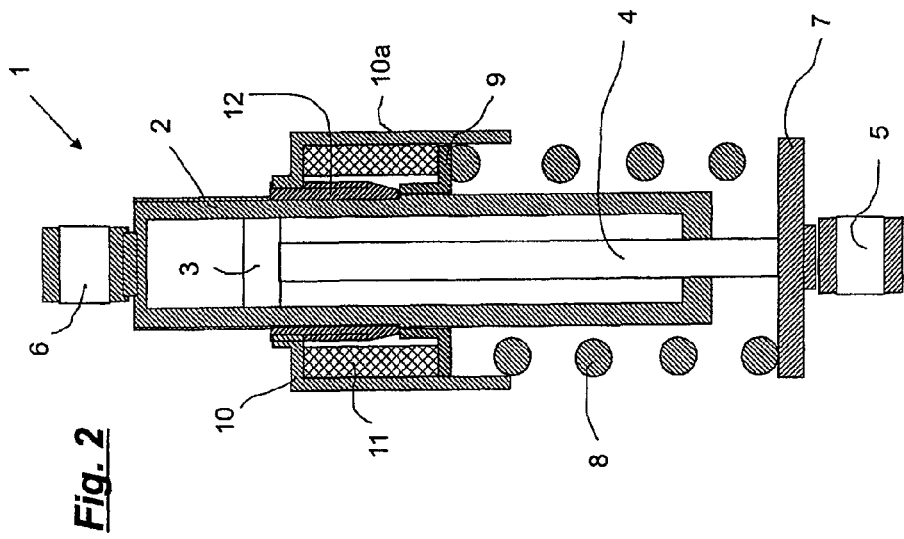
FIG. 1 depicts a suspension strut according to an embodiment of the present invention.

A suspension strut 1 is a component of a wheel suspension (not shown in detail) of a wheel of a vehicle, in more precise terms a front or rear wheel of a motorcycle. Such suspension struts are well known so that the image in the drawing is restricted solely to the functional components.

The suspension strut 1 consists of a damping cylinder 2, in which is guided a damping piston 3. An outwardly leading piston rod 4 engages with the damping piston 3. The exposed section of said piston rod has a fixing lug 5 for the vehicle wheel that is to be attached. On the opposite side the damping cylinder 2 is securely mounted on the vehicle chassis with a similar fixing lug 6.

Above its fixing lug 5 and outside the damping cylinder 2, the piston rod bears a spring plate 7, on which rests the lower end of the helical spring 8. The helical spring 8 is oriented coaxially to the damping cylinder 2, and its turns are arranged at an adequate distance from the outer wall of the cylinder. In addition, the helical spring 8 extends as far as approximately the center of the longitudinal expansion of the damping cylinder 2, where the helical spring 8 is supported on the underside of an additional spring plate 9, which in turn is positioned in an axially displaceable manner on the cylinder outer wall of the damping cylinder 2.

Between the upper side of the spring plate 9 and a stop 10 there is clamped an elastomer block 11, which acts as the spring element and which in this manner is connected in series to the helical spring 8. In this case the elastomer block 11 is dimensioned in such a manner that a cavity is produced between the inner wall of said elastomer block and the outer wall of the damping cylinder 2. During compression of the suspension strut, the helical spring 8 and, owing to said helical spring, the elastomer block 11 are pushed over the axially displacement spring plate 9. In so doing, said elastomer block cannot escape radially outwardly (a feature that will be explained below in greater detail) and, therefore, fills more and more the cavity between it and the outer wall of the cylinder. During rebound, the elasticity of the elastomer block allows it then to return to the base shape that is shown in FIG. 1.

Figure 2:
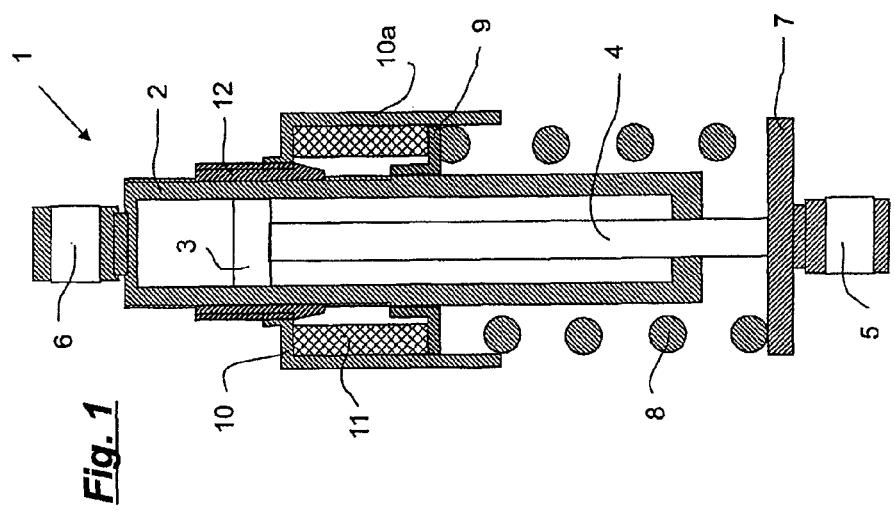
FIG. 2 depicts the suspension strut of FIG. 1 with a totally inserted control sleeve.

A control sleeve 12 is guided in an axially displaceable manner on the outer periphery of the damping cylinder 2 above the cavity. The guide is caused by an external thread on the cylinder jacket of the damping cylinder 2, with which an internal thread of the control sleeve 12 meshes. FIG. 1 shows an upper end position of the control sleeve 12, in which it and a conically shaped end project somewhat into the cavity. FIG. 2 shows the control sleeve displaced into a lower end position by way of the said thread guide. In this position it strikes against the spring plate 9 and, in so doing, switches off the elastomer block 11. Then during a compression movement only the helical spring 8 is compressed. In this case said helical spring braces itself against the housing of the damping cylinder 2 by way of the spring plate 9 and the control sleeve 12.

Between the upper and lower end position, the control sleeve 12 can be moved into any other intermediate position. Depending on how far said control sleeve projects into the cavity during displacement, it more or less blocks the space, into which the elastomer block 11 would expand during a compression phase. As a result, the spring block 11 changes its spring rate and, thus, the spring rate of the entire system.

In order to prevent the elastomer block 11 from escaping radially in the outward direction during a compression phase, the outer circumference of said elastomer block is enveloped by a sleeve jacket 10*a*, which is molded on the stop 10 and is oriented coaxially to the damping cylinder 2.

The stop 10 itself is connected in turn to the control sleeve 12 by means of a setting thread. In this way the stop 10 can be displaced axially in the upward or downward direction and with said stop the upper spring base of the series connected suspension system comprising a helical spring 8 and an elastomer block 11. The entire spring preload can be additionally changed in this manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A suspension strut, comprising:
   a damping cylinder, the damping cylinder including a damping piston affixed to an outwardly guided piston rod;
   a first spring element, wherein a first portion of the first spring element is supported at a first end of the piston rod and a second portion of the first spring element is supported on a displaceable spring plate arranged on the damping cylinder;
   a second spring element formed from an elastomer, wherein
   a first portion of the second spring element is supported on the displaceable spring plate and a second portion of the second spring element is supported on a stop affixed on the damping cylinder, and
   at least one section of the second spring element is arranged on the damping cylinder such that a cavity exists between the at least one section of the second spring element and a cylinder wall of the damping cylinder; and
   a control sleeve, the control sleeve being arranged to be axially displaceable on the damping cylinder such that at least a portion of the control sleeve is displaceable into the cavity,
   wherein
   the control sleeve and the displaceable spring plate are arranged to contact one another when the control sleeve is positioned in a lower position, and
   the control sleeve includes a thread arranged to mesh with a corresponding internal thread of the stop to permit axial displacement of the stop.
2. The suspension strut as claimed in claim 1, wherein a guide is arranged on an outer jacket of the damping cylinder to guide axial displacement of the control sleeve on the damping cylinder.
3. The suspension strut as claimed in claim 2, wherein the guide is an external thread on the outer jacket and is arranged to mesh with a corresponding internal thread of the control sleeve.
4. The suspension strut as claimed in claim 3, wherein the control sleeve is arranged to be driven for axial displacement by hand or by an actuating drive.
5. The suspension strut as claimed in claim 2, wherein the control sleeve is arranged to be driven for axial displacement by hand or by an actuating drive.
6. The suspension strut as claimed in claim 1, wherein the control sleeve is arranged to be driven for axial displacement by hand or by an actuating drive.
7. The suspension strut as claimed in claim 1, wherein the stop is provided with a sleeve jacket arranged to envelope the second spring element.

* * * * *